US008026478B2

(12) United States Patent
Bajic

(10) Patent No.: US 8,026,478 B2
(45) Date of Patent: Sep. 27, 2011

(54) MASS SPECTROMETER

(75) Inventor: Stevan Bajic, Cheshire (GB)

(73) Assignee: Micromass UK Limited, Manchester (GB)

( * ) Notice: Subject to any disclaimer, the term of this patent is extended or adjusted under 35 U.S.C. 154(b) by 290 days.

(21) Appl. No.: 12/297,089

(22) PCT Filed: Apr. 24, 2007

(86) PCT No.: PCT/GB2007/001480
§ 371 (c)(1),
(2), (4) Date: Jan. 23, 2009

(87) PCT Pub. No.: WO2007/125297
PCT Pub. Date: Nov. 8, 2007

(65) Prior Publication Data

US 2009/0242749 A1 Oct. 1, 2009

Related U.S. Application Data

(60) Provisional application No. 60/798,367, filed on May 5, 2006.

(30) Foreign Application Priority Data

Apr. 24, 2006 (GB) .................................. 0608024.6

(51) Int. Cl.
*G01N 30/72* (2006.01)
*H01J 49/04* (2006.01)

(52) U.S. Cl. ........ 250/288; 250/281; 250/282; 250/284; 250/290; 250/292

(58) Field of Classification Search .................. 250/281, 250/282, 284, 288, 290, 292
See application file for complete search history.

(56) References Cited

U.S. PATENT DOCUMENTS

| | | | | |
|---|---|---|---|---|
| 4,298,795 | A | 11/1981 | Takeuchi et al. | |
| 5,868,322 | A | 2/1999 | Loucks, Jr. et al. | |
| 5,879,949 | A | 3/1999 | Cole et al. | |
| 6,646,257 | B1 * | 11/2003 | Fischer et al. | 250/288 |
| 2004/0195218 | A1 | 10/2004 | Tao et al. | |

FOREIGN PATENT DOCUMENTS

WO 00/19192 6/2000

OTHER PUBLICATIONS

Klampfl, Christian W., Review coupling of capillary electrochromatography to mass spectrometry, Journal of Chromatography, 2004, p. 131-144, vol. 1044, Elsevier, Austria.

* cited by examiner

*Primary Examiner* — David A Vanore
(74) *Attorney, Agent, or Firm* — Waters Technologies Corp; Diederiks & Whitelaw

(57) ABSTRACT

An Electrospray ionization ion source is disclosed comprising a capillary tube surrounded by a gas nebulizer tube. One or more wires are provided within the capillary tube. An analyte solution is supplied to the capillary tube and a nebulizing gas is supplied to the gas nebuliser tube.

22 Claims, 5 Drawing Sheets

MASS SPECTROMETER

CROSS REFERENCE TO RELATED APPLICATIONS

This application is the National Stage of International Application No. PCT/GB2007/001480, filed on Apr. 24, 2007 and designating the United States, which claims priority to and benefit of U.S. Provisional Patent Application Ser. No. 60/798,367, filed on May 5, 2006, and priority to and benefit of United Kingdom Patent Application No. 0608024.6, filed Apr. 24, 2006. The entire contents of these applications are incorporated herein by reference.

BACKGROUND OF THE INVENTION

The present invention relates to an ion source, preferably an Electrospray ionisation ion source, a mass spectrometer, a method of ionising a sample and a method of mass spectrometry.

Electrospray Ionisation ("ESI") has established itself as the most widely used ionisation technique for Liquid Chromatography/Mass Spectrometry ("LC/MS") systems. Electrospray ionisation involves passing a liquid down an open tubular capillary which is maintained at a relatively high voltage with respect to an ion sampling orifice of an adjacent mass spectrometer. In the case of high liquid flow rates (e.g. 5-1000 μl/min) it is common to use a combination of a concentric flow of a high velocity nebulisation gas and a heated desolvation gas in order to aid the desolvation process.

Charged droplets are formed by the combined action of electrostatic and electrohydrodynamic forces at the capillary tip. The droplets then undergo desolvation until a point is reached where the increasing repulsive forces within the droplet exceed the surface tension. At this point of instability, termed the Rayleigh limit, the droplets undergo a fission process which results in the production of a number of smaller charged droplets commonly referred to as progeny droplets. The desolvation and, fission process can then proceed further so that second generation charged droplets are produced which are even smaller. A point is then reached where ions are released into the gas phase according to an ion evaporation or charge residue model.

Most theories concerning the mechanism of Electrospray ionisation predict that relatively high efficiency Electrospray ionisation can be achieved from highly charged small droplets having a high surface charge density. Gas phase ions are obtained from first or early generation progeny droplets that require only mild desolvation.

Nanospray ionisation, which is conducted at flow rates of 10-100 nl/min, is an example of a high efficiency Electrospray process wherein sub-micron, highly charged, first generation droplets are generated without the need for concentric nebulisation or desolvation gases. Nanospray ionisation from early generation droplets is also less susceptible to matrix suppression effects wherein co-eluting sample matrix components become concentrated during desolvation and compete with the analyte ions for the available charge.

Conversely, conventional Electrospray ionisation at relatively high flow rates (e.g. 100-1000 μl/min) is relatively inefficient since relatively large (>10 μm) droplets are created having a relatively low surface charge density. Relatively high desolvation temperatures are required in order to yield ions from later generation droplets and the process is more susceptible to matrix suppression effects.

Commercially available Electrospray ionisation ion sources for mass spectrometers are designed such that the internal diameter of the open tubular liquid capillary is increased as the desired flow rate is increased. The internal diameter of a capillary for nanovial Electrospray ionisation is typically 1 μm whereas the internal diameter of a capillary for conventional high flow rate Electrospray ionisation may be typically about 130 μm. Experimental techniques have confirmed that the average droplet diameters for nanospray are typically sub-micron whereas for high flow rate Electrospray ionisation the average droplet diameter is between 10-20 μm. If an attempt is made to use a narrow bore capillary at high flow rates then a number of practical problems are encountered. Narrow bore capillaries at high flow rates require greater pressure in order to maintain the required flow rate and are more prone to blockages. Narrow bore capillaries also suffer from poor reproducibility due to the difficulty in producing consistent spraying conditions.

The advent of a new generation of liquid chromatography (LC) columns, such as Ultra Pressure LC (UPLC) and monolithic LC columns, has facilitated high chromatographic efficiency for short retention times with the use of high mobile phase flow rates (500-3000 μl/min). These technologies have reversed the previous trend of reducing both the LC column dimension and the flow rate. As a result, there exists a need for a high efficiency Electrospray ionisation ion source which exhibits reduced matrix suppression effects and which is capable of operating at relatively high flow rates.

It is therefore desired to provide an improved ion source.

SUMMARY OF THE INVENTION

According to an aspect of the present invention there is provided an ion source comprising:

a first flow device;

a second flow device which surrounds at least part of the first flow device; and one or more wires, rods or obstructions located within the first flow device.

The first and second flow devices are preferably co-axial. The one or more wires, rods or obstructions are preferably located centrally within the first flow device.

The one or more wires, rods or obstructions preferably have an outer diameter selected from the group consisting of: (i) <10 μm; (ii) 10-20 μm; (iii) 20-30 μm; (iv) 30-40 μm; (v) 40-50 μm; (vi) 50-60 μm; (vii) 60-70 μm; (viii) 70-80 μm; (ix) 80-90 μm; (x) 90-100 μm; (xi) 100-110 μm; (xii) 110-120 μm; (xiii) 120-130 μm; (xiv) 130-140 μm; (xv) 140-150 μm; (xvi) 150-160 μm; (xvii) 160-170 μm; (xviii) 170-180 μm; (xix) 180-190 μm; (xx) 190-200 μm; (xxi) 200-250 μm; (xxii) 250-300 μm; (xxiii) 300-350 μm; (xxiv) 350-400 μm; (xxv) 400-450 μm; (xxvi) 450-500 μm; (xxvii) 500-600 μm; (xxviii) 600-700 μm; (xxix) 700-800 μm; (xxx) 800-900 μm; (xxxi) 900-1000 μm; and (xxxii) >1000 μm.

The one or more wires, rods or obstructions preferably have a cross-sectional area selected from the group consisting of: (i) <100 $\mu m^2$; (ii) 100-500 $\mu m^2$; (iii) 500-1000 $\mu m^2$; (iv) 1000-2000 $\mu m^2$; (v) 2000-3000 $\mu m^2$; (vi) 3000-4000 $\mu m^2$; (vii) 4000-5000 $\mu m^2$; (viii) 5000-6000 $\mu m^2$; (ix) 6000-7000 $\mu m^2$; (x) 7000-8000 $\mu m^2$; (xi) 8000-9000 $\mu m^2$; (xii) 9000-10000 $\mu m^2$; (xiii) 10000-15000 $\mu m^2$; (xiv) 15000-20000 $\mu m^2$; (xv) 20000-30000 $\mu m^2$; (xvi) 30000-40000 $\mu m^2$; (xvii) 40000-50000 $\mu m^2$; (xviii) 50000-60000 $\mu m^2$; (xix) 60000-70000 $\mu m^2$; (xx) 70000-80000 $\mu m^2$; (xxi) 80000-90000 $\mu m^2$; (xxii) 90000-100000 $\mu m^2$; and (xxiii) >100000 $\mu m^2$.

The first flow device preferably has an average internal cross-sectional area A and the one or more wires, rods or obstructions preferably have a combined or total cross-sectional area of: (i) <0.05 A; (ii) 0.05-0.10 A; (iii) 0.10-0.15 A;

(iv) 0.15-0.20 A; (v) 0.20-0.25 A; (vi) 0.25-0.30 A; (vii) 0.30-0.35 A; (viii) 0.35-0.40 A; (ix) 0.40-0.45 A; (x) 0.45-0.50 A; (xi) 0.50-0.55 A; (xii) 0.55-0.60 A; (xiii) 0.60-0.65 A; (xiv) 0.65-0.70 A; (xv) 0.70-0.75 A; (xvi) 0.75-0.80 A; (xvii) 0.80-0.85 A; (xviii) 0.85-0.90 A; (xix) 0.90-0.95 A; and (xx) >0.95 A.

According to an embodiment the one or more wires, rods or obstructions may extend or protrude a distance 1 beyond the end of the first flow device, wherein 1 is preferably selected from the group consisting of: (i) <0.25 mm; (ii) 0.25-0.50 mm; (iii) 0.50-0.75 mm; (iv) 0.75-1.00 mm; (v) 1.00-1.25 mm; (vi) 1.25-1.50 mm; (vii) 1.50-1.75 mm; (viii) 1.75-2.00 mm; and (ix) >2.00 mm.

At least a portion or substantially the whole of the one or more wires, rods or obstructions preferably has a substantially circular, oval, elliptical, triangular, square, rectangular, quadrilateral, pentagonal, hexagonal, heptagonal, octagonal or polygonal cross-section.

The one or more wires, rods or obstructions preferably comprise stainless steel, a metal, a conductor or an alloy.

The one or more wires, rods or obstructions may be drawn to a relatively sharp point.

The one or more wires, rods or obstructions may have a point radius r, wherein r is selected from the group consisting of: (i) <1 μm; (ii) 1-2 μm; (iii) 2-3 μm; (iv) 3-4 μm; (v) 4-5 μm; (vi) 5-6 μm; (vii) 6-7 μm; (viii) 7-8 μm; (ix) 8-9 μm; (x) 9-10 μm; and (xi) >10 μm.

According to an embodiment two, three, four, five, six, seven, eight, nine, ten or more than ten wires, rods or obstructions may be located within the first flow device.

According to an embodiment the one or more wires, rods or obstructions may have different sizes and/or cross-sectional shapes or areas.

The one or more wires, rods or obstructions preferably comprise one or more outwardly extending radial protrusions which preferably assist in positioning the one or more wires, rods or obstructions close to or substantially along the central axis of the first flow device.

According to an embodiment the one or more wires, rods or obstructions are maintained at a voltage selected from the group consisting of: (i) <−10 kV; (ii) −10 to −9 kV; (iii) −9 to −8 kV; (iv) −8 to −7 kV; (v) −7 to −6 kV; (vi) −6 to −5 kV; (vii) −5 to −4 kV; (viii) −4 to −3 kV; (ix) −3 to −2 kV; (x) −2 to −1 kV; (xi) −1 to 0 kV; (xii) 0-1 kV; (xiii) 1-2 kV; (xiv) 2-3 kV; (xv) 3-4 kV; (xvi) 4-5 kV; (xvii) 5-6 kV; (xviii) 6-7 kV; (xix) 7-8 kV; (xx) 8-9 kV; (xxi) 9-10 kV; and (xxii) >10 kV.

The first flow device preferably comprises an Electrospray ionisation capillary. According to an embodiment the first flow device comprise one or more capillary tubes.

The first flow device preferably has an inner diameter selected from the group consisting of: (i) <50 μm; (ii) 50-100 μm; (iii) 100-150 μm; (iv) 150-200 μm; (v) 200-250 μm; (vi) 250-300 μm; (vii) 300-350 μm; (viii) 350-400 μm; (ix) 400-450 μm; (x) 450-500 μm; (xi) 500-550 μm; (xii) 550-600 μm; (xiii) 600-650 μm; (xiv) 650-700 μm; (xv) 750-800 μm; (xvi) 800-850 μm; (xvii) 850-900 μm; (xviii) 900-950 μm; (xix) 950-1000 μm; and (xx) >1000 μm.

The first flow device preferably has an outer diameter selected from the group consisting of: (i) <50 μm; (ii) 50-100 μm; (iii) 100-150 μm; (iv) 150-200 μm; (v) 200-250 μm; (vi) 250-300 μm; (vii) 300-350 μm; (viii) 350-400 μm; (ix) 400-450 μm; (x) 450-500 μm; (xi) 500-550 μm; (xii) 550-600 μm; (xiii) 600-650 μm; (xiv) 650-700 μm; (xv) 750-800 μm; (xvi) 800-850 μm; (xvii) 850-900 μm; (xviii) 900-950 μm; (xix) 950-1000 μm; and (xx) >1000 μm.

The first flow device preferably has a substantially circular, oval, elliptical, triangular, square, rectangular, quadrilateral, pentagonal, hexagonal, heptagonal, octagonal or polygonal cross-section.

The first flow device preferably comprises a stainless steel, metallic, conductive or alloy tube. An analyte solution is preferably supplied, in use, to or passed along the first flow device. The analyte solution is preferably supplied, in use, to or passed along the first flow device at a flow rate selected from the group consisting of: (i) <1 μl/min; (ii) 1-10 μl/min; (iii) 10-50 μl/min; (iv) 50-100 μl/min; (v) 100-200 μl/min; (vi) 200-300 μl/min; (vii) 300-400 μl/min; (viii) 400-500 μl/min; (ix) 500-600 μl/min; (x) 600-700 μl/min; (xi) 700-800 μl/min; (xii) 800-900 μl/min; (xiii) 900-1000 μl/min; (xiv) 1000-1500 μl/min; (xv) 1500-2000 μl/min; (xvi) 2000-2500 μl/min; and (xvii) >2500 μl/min.

The first flow device preferably comprises one or more inwardly extending radial protrusions which preferably assist in positioning the one or more wires, rods or obstructions close to or substantially along the central axis of the first flow device.

The first flow device is preferably maintained, in use, at a voltage selected from the group consisting of: (i) <−10 kV; (ii) −10 to −9 kV; (iii) −9 to −8 kV; (iv) −8 to −7 kV; (v) −7 to −6 kV; (vi) −6 to −5 kV; (vii) −5 to −4 kV; (viii) −4 to −3 kV; (ix) −3 to −2 kV; (x) −2 to −1 kV; (xi) −1 to 0 kV; (xii) 0-1 kV; (xiii) 1-2 kV; (xiv) 2-3 kV; (xv) 3-4 kV; (xvi) 4-5 kV; (xvii) 5-6 kV; (xviii) 6-7 kV; (xix) 7-8 kV; (xx) 8-9 kV; (xxi) 9-10 kV; and (xxii) >10 kV.

Analyte solution is preferably emitted from the first flow device as an annular flow. The annular flow preferably has an outer diameter selected from the group consisting of: (i) <10 μm; (ii) 10-20 μm; (iii) 20-30 μm; (iv) 30-40 μm; (v) 40-50 μm; (vi) 50-60 μm; (vii) 60-70 μm; (viii) 70-80 μm; (ix) 80-90 μm; (x) 90-100 μm; (xi) 100-110 μm; (xii) 110-120 μm; (xiii) 120-130 μm; (xiv) 130-140 μm; (xv) 140-150 μm; (xvi) 150-160 μm; (xvii) 160-170 μm; (xviii) 170-180 μm; (xix) 180-190 μm; (xx) 190-200 μm; (xxi) 200-250 μm; (xxii) 250-300 μm; (xxiii) 300-350 μm; (xxiv) 350-400 μm; (xxv) 400-450 μm; (xxvi) 450-500 μm; (xxvii) 500-600 μm; (xxviii) 600-700 μm; (xxix) 700-800 μm; (xxx) 800-900 μm; (xxxi) 900-1000 μm; and (xxxii) >1000 μm. The annular flow preferably has an inner diameter selected from the group consisting of: (i) <10 μm; (ii) 10-20 μm; (iii) 20-30 μm; (iv) 30-40 μm; (v) 40-50 μm; (vi) 50-60 μm; (vii) 60-70 μm; (viii) 70-80 μm; (ix) 80-90 μm; (x) 90-100 μm; (xi) 100-110 μm; (xii) 110-120 μm; (xiii) 120-130 μm; (xiv) 130-140 μm; (xv) 140-150 μm; (xvi) 150-160 μm; (xvii) 160-170 μm; (xviii) 170-180 μm; (xix) 180-190 μm; (xx) 190-200 μm; (xxi) 200-250 μm; (xxii) 250-300 μm; (xxiii) 300-350 μm; (xxiv) 350-400 μm; (xxv) 400-450 μm; (xxvi) 450-500 μm; (xxvii) 500-600 μm; (xxviii) 600-700 μm; (xxix) 700-800 μm; (xxx) 800-900 μm; (xxxi) 900-1000 μm; and (xxxii) >1000 μm.

The annular flow preferably has a thickness (i.e. distance between the inner and outer diameters) selected from the group consisting of: (i) <10 μm; (ii) 10-20 μm; (iii) 20-30 μm; (iv) 30-40 μm; (v) 40-50 μm; (vi) 50-60 μm; (vii) 60-70 μm; (viii) 70-80 μm; (ix) 80-90 μm; (x) 90-100 μm; (xi) 100-110 μm; (xii) 110-120 μm; (xiii) 120-130 μm; (xiv) 130-140 μm; (xv) 140-150 μm; (xvi) 150-160 μm; (xvii) 160-170 μm; (xviii) 170-180 μm; (xix) 180-190 μm; (xx) 190-200 μm; (xxi) 200-250 μm; (xxii) 250-300 μm; (xxiii) 300-350 μm; (xxiv) 350-400 μm; (xxv) 400-450 μm; (xxvi) 450-500 μm; (xxvii) 500-600 μm; (xxviii) 600-700 μm; (xxix) 700-800 μm; (xxx) 800-900 μm; (xxxi) 900-1000 μm; and (xxxii) >1000 μm.

The second flow device preferably has an inner diameter selected from the group consisting of: (i) <50 μm; (ii) 50-100 μm; (iii) 100-150 μm; (iv) 150-200 μm; (v) 200-250 μm; (vi) 250-300 μm; (vii) 300-350 μm; (viii) 350-400 μm; (ix) 400-450 μm; (x) 450-500 μm; (xi) 500-550 μm; (xii) 550-600 μm; (xiii) 600-650 μm; (xiv) 650-700 μm; (xv) 750-800 μm; (xvi) 800-850 μm; (xvii) 850-900 μm; (xviii) 900-950 μm; (xix) 950-1000 μm; and (xx) >1000 μm.

The second flow device preferably has a substantially circular, oval, elliptical, triangular, square, rectangular, quadrilateral, pentagonal, hexagonal, heptagonal, octagonal or polygonal cross-section.

The second flow device preferably comprises a gas nebuliser capillary and preferably comprises one or more capillary tubes.

The second flow device preferably comprises a stainless steel, metallic, conductive or alloy tube.

A first gas (preferably nitrogen) is preferably supplied, in use, to the second flow device. According to other embodiments a first gas other than nitrogen may be supplied to the second flow device. The first gas is preferably supplied, in use, at a flow rate selected from the group consisting of: (i) <1 l/hr; (ii) 1-10 l/hr; (iii) 10-50 l/hr; (iv) 50-100 l/hr; (v) 100-150 l/hr; (vi) 150-200 l/hr; (vii) 200-250 l/hr; (viii) 250-300 l/hr; (ix) 300-350 l/hr; (x) 350-400 l/hr; (xi) 400-450 l/hr; (xii) 450-500 l/hr; and (xiii) >500 l/hr. The first gas preferably aids nebulisation of an analyte solution supplied, in use, to the first flow device.

The first gas is preferably supplied, in use, at a pressure of <1, 1-2, 2-3, 3-4, 4-5, 5-6, 6-7, 7-8, 8-9, 9-10 or >10 bar.

The second flow device is preferably maintained, in use, at a voltage selected from the group consisting of: (i) <−10 kV; (ii) −10 to −9 kV; (iii) −9 to −8 kV; (iv) −8 to −7 kV; (v) −7 to −6 kV; (vi) −6 to −5 kV; (vii) −5 to −4 kV; (viii) −4 to −3 kV; (ix) −3 to −2 kV; (x) −2 to −1 kV; (xi) −1 to 0 kV; (xii) 0-1 kV; (xiii) 1-2 kV; (xiv) 2-3 kV; (xv) 3-4 kV; (xvi) 4-5 kV; (xvii) 5-6 kV; (xviii) 6-7 kV; (xix) 7-8 kV; (xx) 8-9 kV; (xxi) 9-10 kV; and (xxii) >10 kV.

The ion source preferably comprises an Electrospray ionisation ion source and/or an Atmospheric Pressure Ionisation ion source.

The ion source preferably further comprises a desolvation heater for heating a gas and providing a desolvation gas stream.

According to another aspect of the present invention there is provided a mass spectrometer comprising an ion source as described above.

The mass spectrometer preferably comprises an ion inlet cone having a central axis. The ion inlet cone is preferably arranged downstream of the ion source.

The ion source preferably has a central axis and the central axis of the ion inlet cone preferably intersects the central axis of the ion source at an intersection point. The distance along the central axis of the ion source from the end of the first flow device to the intersection point is preferably x mm, wherein x is selected from the group consisting of: (i) <1; (ii) 1-5; (iii) 5-10; (iii) 10-15; (iv) 15-20; (v) 20-25; (vi) 25-30; (vii) 30-35; (viii) 35-40; (ix) 40-45; (x) 45-50; and (xi) >50.

The ion source preferably has a central axis and the central axis of the ion inlet cone preferably intersects the central axis of the ion source at an intersection point. The distance along the central axis of the ion inlet cone from the end of the ion inlet cone to the intersection point is preferably z mm, wherein z is selected from the group consisting of: (i) <1; (ii) 1-5; (iii) 5-10; (iii) 10-15; (iv) 15-20; (v) 20-25; (vi) 25-30; (vii) 30-35; (viii) 35-40; (ix) 40-45; (x) 45-50; and (xi) >50.

According to an embodiment the ion source has a central axis and the angle θ between the central axis of the ion source and the central axis of the ion inlet cone is selected from the group consisting of: (i) 0-10°; (ii) 10-20°; (iii) 20-30°; (iv) 30-40°; (v) 40-50°; (vi) 50-60°; (vii) 60-70°; (viii) 70-80°; (ix) 80-90°; (x) 90-100°; (xi) 100-110°; (xii) 110-120°; (xiii) 120-130°; (xiv) 130-140°; (xv) 140-150°; (xvi) 150-160°; (xvii) 160-170'; and (xviii) 170-180°.

According to an embodiment the ion inlet cone is preferably maintained, in use, at a voltage selected from the group consisting of: (i) <−10 kV; (ii) −10 to −5 kV; (iii) −5 to −4 kV; (iv) −4 to −3 kV; (v) −3 to −2 kV; (vi) −2 to −1 kV; (vii) −1000 to −900 V; (viii) −900 to −800 V; (ix) −800 to −700 V; (x) −700 to −600 V; (xi) −600 to −500 V; (xii) −500 to −400 V; (xiii) −400 to −300 V; (xiv) −300 to −200 V; (xv) −200 to −100 V; (xvi) −100 to 0V; (xvii) 0-100 V; (xviii) 100-200 V; (xix) 200-300 V; (xx) 300-400 V; (xxi) 400-500 V; (xxii) 500-600 V; (xxiii) 600-700 V; (xxiv) 700-800 V; (xxv) 800-900 V; (xxvi) 900-1000 V; (xxvii) 1-2 kV; (xxviii) 2-3 kV; (xxix) 3-4 kV; (xxx) 4-5 kV; (xxxi) 5-10 kV; and (xxxii) >10 kV.

The mass spectrometer preferably further comprises a mass analyser selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Flight mass analyser; (vi) a magnetic sector mass analyser; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic Ion Cyclotron Resonance mass analyser; (xiii) an electrostatic Fourier Transform mass analyser; and (xiv) a quadrupole rod set mass filter or mass analyser.

According to another aspect of the present invention there is provided a method of ionising a sample comprising:

supplying an analyte solution to a first flow device;

supplying a first gas to a second flow device which surrounds at least part of the first flow device; and providing one or more wires, rods or obstructions within the first flow device.

According to another aspect of the present invention there is provided a method of mass spectrometry comprising a method of ionising a sample as described above.

According to the preferred embodiment an Electrospray ionisation ("ESI") probe is provided which preferably utilises a central conducting wire. The central wire is preferably inserted into the bore of an open tubular Electrospray ionisation capillary for the purpose of reducing the cross-section dimension of the liquid layer or column prior to spraying and nebulisation. As a result, an annulus-type liquid layer or column is preferably formed which preferably has a reduced layer thickness when compared to the diameter of a corresponding cylinder-type liquid column area resulting from a conventional open tubular capillary of equivalent cross-sectional area.

The central conducting wire may be drawn to a relatively sharp point in order to increase the field strength in the region of spraying and nebulisation. The combination of a reduced liquid cross-section and increased field strength preferably yields smaller droplets having a higher surface charge density. This in turn preferably improves the efficiency of desolvation of early generation droplets and results in higher sensitivity and reduced susceptibility to matrix suppression effects.

An annular-type liquid layer or column according to the preferred embodiment is particularly advantageous when compared to a comparable conventional cylindrical liquid column since it has a larger cross-sectional area. As a consequence less pressure is required to maintain the required liquid flow rate. The ion source according to the preferred embodiment is also less prone to capillary blockage.

According to an embodiment, the central conducting wire may be circular and the open tube capillary may also be circular. The central wire may be relatively large and may be pinched at two or more points along its length so that small radial protrusions are formed along its length. The protrusions preferably help to space the central wire from the outer open tube capillary and preferably assist in keeping the wire disposed along the central axis of the open tube capillary. As a result, an annular opening between the central wire and the open tube capillary is preferably maintained.

Alternatively and/or additionally, the Electrospray open tube capillary may be pinched or crimped at one or more positions so that one or more inner or internal dents or protrusions are formed along its length. The internal dents or protrusions preferably help to space the wire away from the open tube capillary and preferably help to keep the wire disposed along the central axis of the open capillary. This also preferably helps to maintain an annular opening between the wire and the outer open tube capillary.

According to other embodiments the central wire may have a non-circular cross-section. For example, the central wire may have a cross-section which is triangular, square, rectangular, quadrilateral, pentagonal, hexagonal, heptagonal, octagonal or any other polygon. If the central wire is relatively large and has a non-circular cross-section then it will only touch the inner wall of the Electrospray open tube capillary at a few places. This will preferably leave passageways open between the central wire and the outer open tube capillary for liquid to flow.

According to an embodiment the Electrospray open tube capillary may have a non-circular cross-section. For example, the Electrospray open tube capillary may have a cross-section which is triangular, square, rectangular, quadrilateral, pentagonal, hexagonal, heptagonal, octagonal or any other polygon. A relatively large central wire having a circular cross-section will only touch the inner wall of an open tube capillary having a non-circular cross-section in a few places and this will preferably leave passageways open between the inner central wire and the outer open tube capillary for liquid to flow. This will also be the case for a central wire having a non-circular cross-section and an open tube capillary having a different shaped non-circular cross-section.

According to an embodiment more than one wire, rod or protrusion may be inserted in or be provided within the open tube capillary. The wires, rods or protrusions may be arranged such that a central conducting wire, rod or protrusion is provided and wherein other wires, rods and protrusions surround the central wire. The central wire, rod or protrusion may be drawn to a relatively sharp point. According to an embodiment seven wires of equal diameter may be inserted into the open tube capillary. One of the wires may be arranged along the central axis of the Electrospray capillary and the other six wires may be arranged in a close packed hexagonal arrangement around the central wire. The central wire may be drawn to a relatively sharp point. The other wires may also be drawn to relatively sharp points. According to an embodiment the wires may be closely packed such that any flow of liquid between the wires is minimised.

According to other embodiments a plurality of wires, rods or protrusions may be inserted into the open tube capillary. The wires, rods or protrusions may have different sizes and/or shapes. Each wire, rod or protrusion may or may not protrude from or extend beyond the end of the open tube capillary. According to an embodiment at least one wire, rod or protrusion may be arranged as a central conducting wire, rod or protrusion and at least this wire, rod or protrusion preferably protrudes from or extends beyond the end of the open tube capillary. The central wire, rod or protrusion is preferably drawn to a relatively sharp point.

BRIEF DESCRIPTION OF THE DRAWINGS

Various embodiments of the present invention will now be described, by way of example only, and with reference to the accompanying drawings in which.

DETAILED DISCUSSION OF THE PREFERRED EMBODIMENTS

Figure 1:
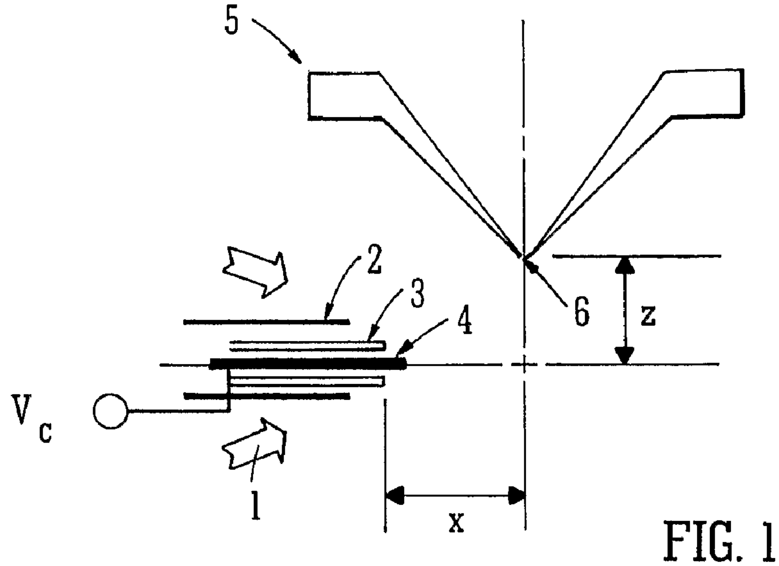
FIG. 1 shows an ion source according to a preferred embodiment.

An Electrospray ionisation ion source according to a preferred embodiment of the present invention is shown in FIG. 1. The ion source comprises a desolvation heater which preferably emits heated nitrogen gas and a probe comprising a gas nebuliser capillary 2 which surrounds an Electrospray ionisation capillary 3. A wire 4 is located centrally within the Electrospray ionisation capillary 3.

An ion inlet cone 5 of a mass spectrometer is shown disposed downstream of the ion source. The ion inlet cone 5 preferably comprises a 0.36 mm diameter ion entrance orifice 6. Ions are preferably drawn into the vacuum system of the mass spectrometer through the ion entrance orifice 6 provided in the inlet cone 5.

A voltage $V_c$ is preferably applied to the outer gas nebuliser capillary 2, the Electrospray ionisation capillary 3 and the central wire 4. The voltage $V_c$ is preferably current limited via a 33 MΩ resistor.

The desolvation heater preferably comprises an annulus-type heater (controllable from ambient to 500° C.) having a gas inlet through which nitrogen gas is preferably introduced. The heater preferably has a gas outlet which preferably has a diameter of 18 mm. The distance between the gas outlet and the ion entrance orifice 6 of the mass spectrometer is preferably arranged to be 18 mm.

The gas nebuliser capillary 2 preferably comprises a stainless steel tube and is preferably approximately 30 mm long. The gas nebuliser capillary 2 preferably has an internal diameter of 330 μ and an external diameter of 630 μm. The Electrospray ionisation capillary 3 located within the gas nebuliser capillary 2 preferably comprises a stainless steel tube which is preferably approximately 200 mm long. The Electrospray ionisation capillary 3 preferably has an internal diameter of 127 μm and an external diameter of 230 μm.

In operation the bore of the Electrospray ionisation capillary 3 preferably serves as a conduit for an analyte solution whilst the bore of the outermost gas nebuliser capillary 2 preferably carries nitrogen, or another, gas at a flow rate of, for example, 150 l/hr. In order to facilitate the venting of undesirable gases to an appropriate extractor system the interface may be surrounded by an enclosure (not shown) which preferably comprises an outlet port.

Figure 2:
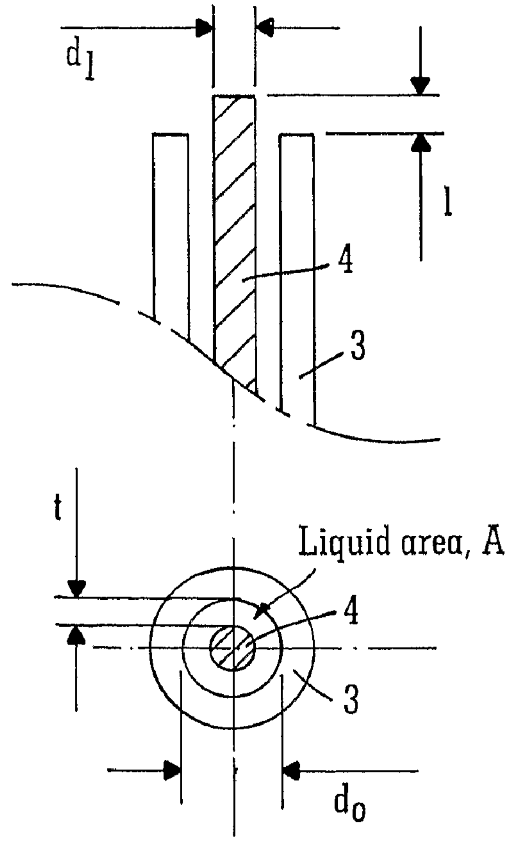
FIG. 2 shows a central wire protruding beyond an Electrospray capillary tube and an annular flow of solution passing along the Electrospray capillary tube according to a preferred embodiment.

Low flow rate experiments were preferably conducted without a nebuliser gas and using a central wire 4 having a diameter of 90 μm. As shown in FIG. 2, the central wire 4 was preferably arranged to protrude a distance 1 beyond the end of the Electrospray ionisation capillary 3. The protrusion distance was preferably arranged to be 0.2-0.8 mm. With reference to FIG. 1, the distance x between the end of the Electrospray capillary tube 3 and the central axis of the ion inlet orifice 6 was preferably arranged to be 4 mm. Similarly, the distance z between the central axis of the wire 4 and the surface of the ion inlet orifice 6 was preferably arranged to be 4 mm.

The central wire tip may be roughly cut square with standard wire snips and the outer source enclosure may be removed (open source). Assuming that the central wire 4 is positioned centrally within the Electrospray capillary 3 then according to the preferred embodiment the thickness t of the resulting annular liquid flow is (127 μm-90 μm)/2=18.5 μm.

High flow rate experiments were also conducted wherein a nebuliser gas was used. The diameter of the central wire 4 was kept at 90 μm. The central wire 4 was arranged to protrude a distance of 1 mm beyond the end of the Electrospray capillary 3. The distances x and z were preferably arranged to be 16 mm and 2 mm respectively. For high flow rate experiments the tip of the central wire 4 was electrolytically etched to a sharp point having a point radius of 4-8 μm. Assuming that the central wire 4 was positioned centrally within the Electrospray capillary 3 then the thickness t of the liquid flow was (127 μm-90 μm)/2=18.5 μm.

Experimental data was acquired at both low and high flow rates using a Waters Quattro Premier® triple quadrupole mass spectrometer and the results are presented below.

Figure 3:
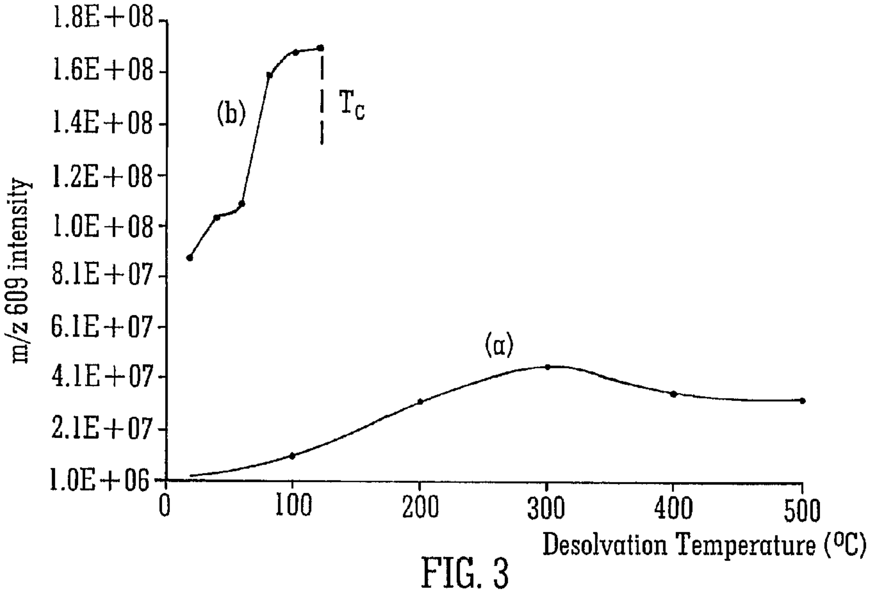
FIG. 3 shows a temperature response (curve (a)) obtained when monitoring the $[M+H]^+$ ion of Reserpine using a conventional Electrospray ionisation ion source and a corresponding response (curve (b)) which was obtained using an ion source according to an embodiment of the present invention wherein a 90 μm diameter central wire was inserted into the capillary tube but no nebuliser gas was used.

Curve (a) of FIG. 3 shows a typical temperature response obtained when monitoring the $[M+H]^+$ ion of Reserpine in a MS mode using a conventional Electrospray ionisation ion source (i.e. without a central wire) and wherein a nebuliser gas flow was provided. The distance x was set at 12 mm and the distance z was set at 2 mm. The analyte sample was infused at a relatively low flow rate of 10 μl/min at a concentration of 609 pg/μl. Under these conditions a relatively high temperature of 300° C. was required in order to optimise the m/z 609 signal.

Curve (b) of FIG. 3 shows a corresponding signal obtained using an ion source according to an embodiment of the present invention wherein a central wire 4 was inserted into the Electrospray ionisation capillary 3 but wherein no nebuliser gas was used. The central wire 4 had a diameter of 90 μm. The distance x was arranged to be 4 mm and the distance z was arranged to be 4 mm. The voltage $V_c$ applied to the gas nebuliser tube 2, the Electrospray ionisation capillary 3 and the central wire 4 was 3.5 kV.

The ion source according to the preferred embodiment was observed to produce a signal which was approximately ×3.7 greater than the signal obtained using a conventional nebulised Electrospray ionisation ion source operating at a flow rate of 10 μl/min. However, it is apparent that a certain critical temperature ($T_c$) exists beyond which the spray becomes unstable and the signal is lost. This behaviour is analagous to the behaviour of a Thermospray ion source. Further experiments were performed which showed that increasing the diameter of the central wire 4 from 25 μm to 50 μm to 75 μm to 90 μm lead to successive increases in the signal intensity (data not shown).

Figure 4:
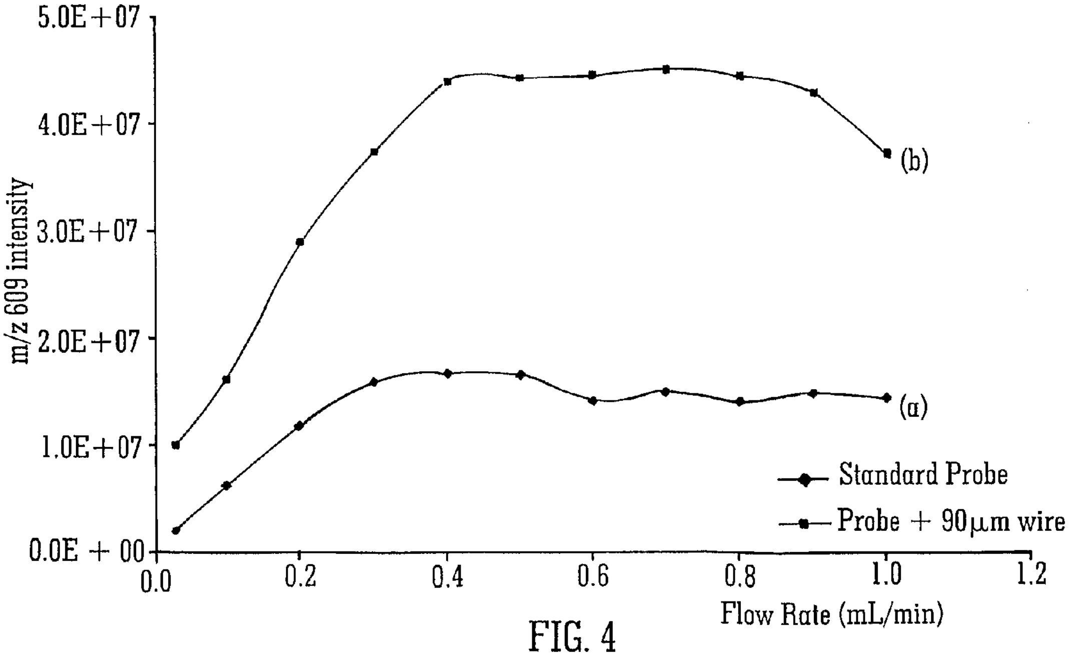
FIG. 4 shows a flow rate response (curve (a)) obtained when monitoring the $[M+H]^+$ ion of Reserpine using a conventional Electrospray ionisation ion source and curve (b) shows how a significantly enhanced response was obtained using an ion source according to an embodiment of the present invention wherein a sharp 90 μm diameter central wire was inserted into the Electrospray capillary tube and the probe position and voltage were re-optimised.

Curve (a) of FIG. 4 shows the recorded signal when monitoring the $[M+H]^+$ ion of Reserpine using a conventional electrospray ionisation probe at different relatively high flow rates ranging from 30 μl/min to 1000 μl/min. For each measurement the probe voltage, the nebulising gas flow rate and the desolvation gas flow rate and temperature were optimised. The positioning of the probe and the desolvation gas flow assembly with respect to the inlet cone 5 of the mass spectrometer were also optimised for each measurement.

Curve (b) of FIG. 4 shows the corresponding recorded signal when monitoring the $[M+H]^+$ ion of Reserpine using an Electrospray ionisation probe according to an embodiment of the present invention. According to this embodiment a sharp 90 μm diameter central wire 4 was inserted into the Electrospray capillary 3. The resulting signal was then recorded for different flow rates over the range 30 μl/min to 1000 μl/min. For each measurement the probe tip was repositioned with respect to the desolvation gas flow in order to optimise the recorded signal. Furthermore, for each measurement the probe voltage and position, the nebulising gas flow rate and the desolvation gas flow rate and temperature were also optimised.

From a comparison of the data shown by curves (a) and (b) of FIG. 4 it can be seen that the inclusion of a sharp central wire 4 in the open tube capillary 3 provides a significant enhancement in sensitivity (by a factor of between ×2.6 and ×5.1) across the flow rate range 30-1000 μl/min.

A number of matrix suppression experiments were then carried out to determine whether or not an ion source according to the preferred embodiment suffered from ion suppression effects at relatively high flow rates. All experimental data which is presented below was acquired using a Waters Acquity® UPLC System with a Waters Acquity® column (C18, 1.7 μm, 2.1×100 mm, 40° C. column oven temperature). According to these experiments 100 pg/μl each of Doxepin, Amitriptyline and Verapamil were infused at 10 μl/min into a 600 μl/min mobile phase gradient. The mobile phase comprised a mixture of two solvents A and B. Solvent A comprised water and 0.005% acetic acid and solvent B comprised methanol and 0.005% acetic acid. The solvent composition was held at 90% A/10% B over a time frame of 0 to 3 minutes and was then changed linearly to 10% A/90% B over the time frame from 3 minutes to 7 minutes. The solvent composition was then held constant at 10% A/90% B for a further minute. Eluting matrix was provided by injection of 10 μl of methanol containing a broad-based low level mixture (contaminant). This gave stable and reproducible ion suppression over the course of the study. All suppression experiments were conducted at a desolvation heater temperature of 500° C.

Figure 5:
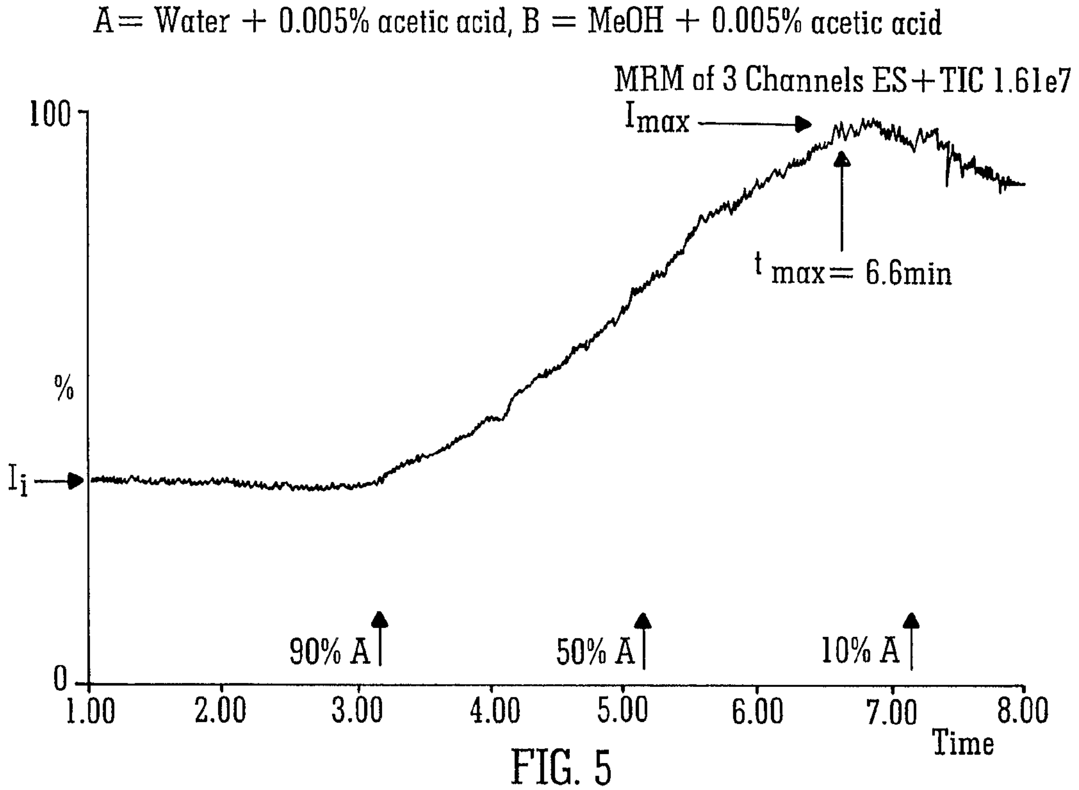
FIG. 5 shows the typical response of a test analyte mixture to a changing mobile phase gradient in the absence of ion suppression effects.

FIG. 5 shows a typical response of the test analyte mixture to a changing mobile phase gradient in the absence of ion suppression i.e. no column and no contaminated methanol injection. The voltage $V_c$ applied to the stainless steel Electrospray capillary was 2 kV. The signal represents the total ion current from three precursor to product ion transitions i.e. one transition per analyte. In the case of no suppression, the Electrospray ionisation signal reached a maximum at approximately $t_{max}$=6.6 minutes. The ratio R of the maximum signal intensity $I_{max}$ to the initial signal intensity $I_i$ was found to be approximately R=3.

Figure 6:
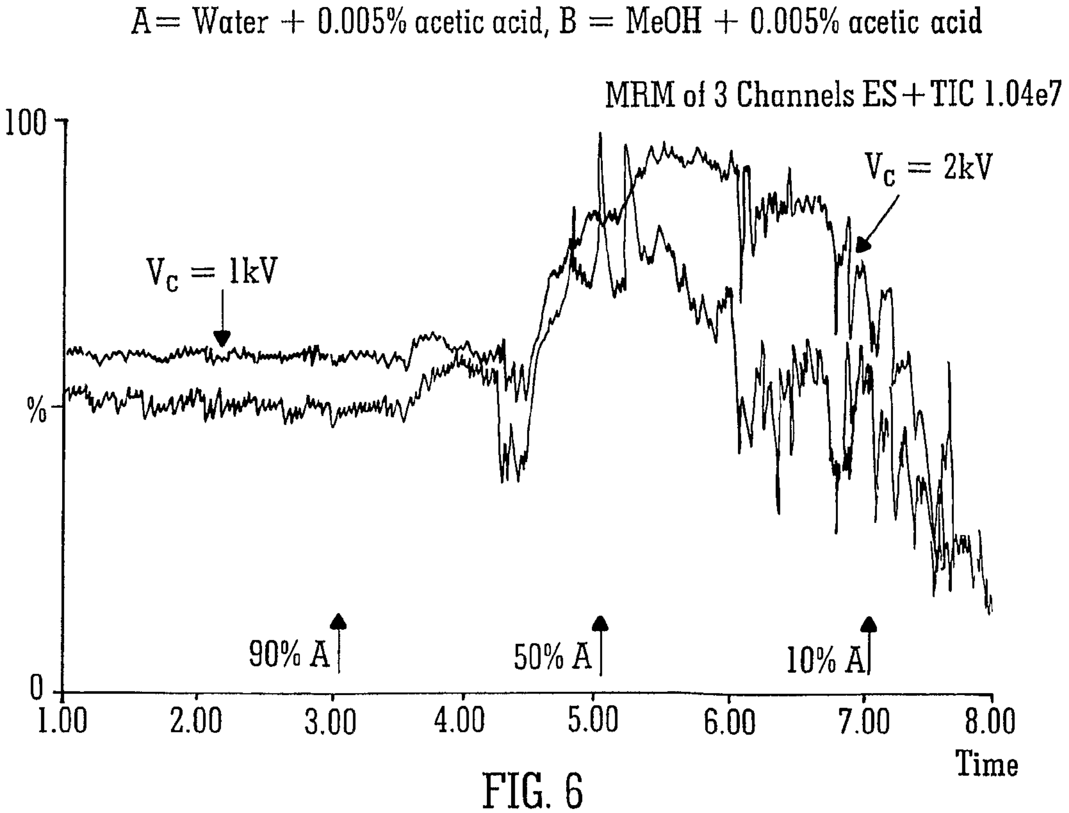
FIG. 6 shows the results of experiments conducted using a conventional Electrospray ionisation probe in the presence of matrix interference (i.e. contaminated injection) and shows the effect of ion suppression.

FIG. 6 shows the results of a corresponding experiment conducted with a conventional Electrospray ionisation probe (i.e. without a central wire) in the presence of matrix interference (i.e. contaminated injection). For $V_c$=1 kV the ion source was optimised for high aqueous solvent but displays a rapid fall off in signal (i.e. ion suppression effects) at high organic solvent (i.e. beyond 50% A). The amount of suppression at high organic is improved to some extent at $V_c$=2 kV but is still poor as evidenced by a low value of R=1.9 and a low value for $t_{max}$=5.5 min.

Figure 7:
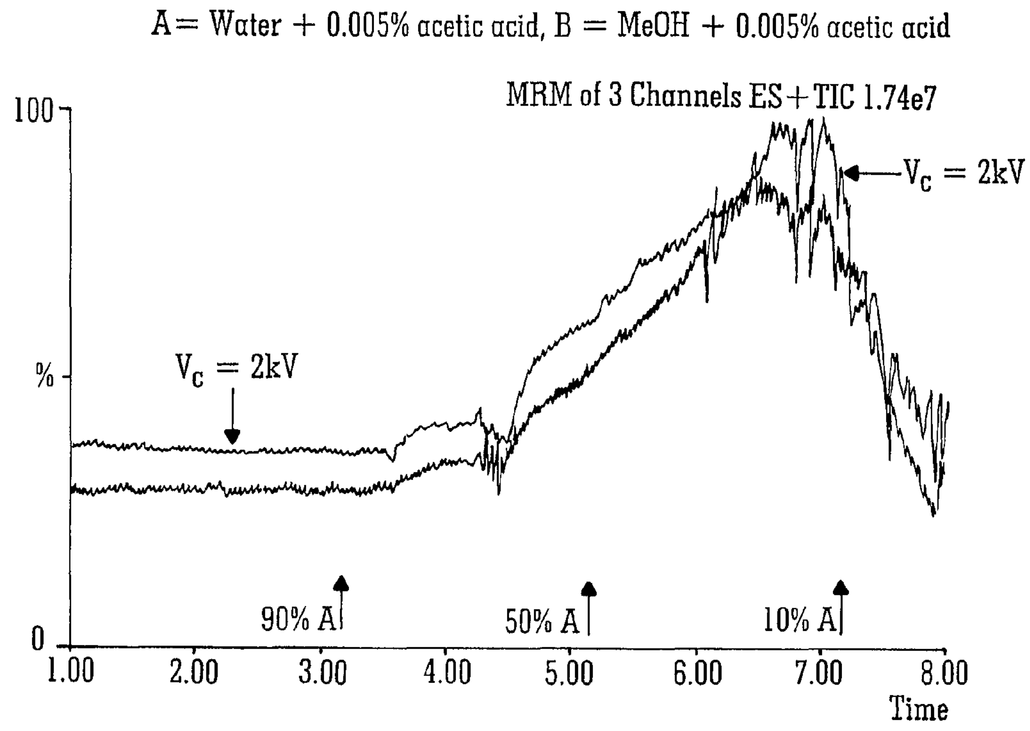
FIG. 7 shows the results of equivalent experiments conducted using an ion source according to an embodiment of the present invention wherein a 90 μm sharp tip central wire was inserted in the Electrospray capillary and wherein ion suppression effects were considerably reduced.

The same experiment was then conducted using an ion source according to a preferred embodiment wherein a 90 μm sharp tip central wire 4 was inserted into the Electrospray capillary tube 3. The responses are shown in FIG. 7. When a voltage of either $V_c$=1 kV or $V_c$=2 kV was applied to the Electrospray ionisation source according to the preferred embodiment then significantly less ion suppression effects were observed as evidenced by R values of 2.5 and 3.3 and $t_{max}$ values of 6.5 and 6.6 minutes respectively. However, a comparison of FIG. 7 with FIG. 5 shows that the preferred ion source exhibited as small degree of susceptibility to ion suppression effects at maximum organic (10% A).

The experimental data presented above clearly demonstrates that the introduction of a sharp central wire 4 into the bore of an Electrospray ionisation capillary 3 significantly increases the sensitivity of the ion and also significantly reduces ion suppression effects. These results support the hypothesis that the introduction of a sharp central wire 4 into the bore of the Electrospray ionisation capillary 3 has the advantageous effect of reducing the diameter of the initial droplet and/or increasing the droplets charging efficiency at relatively high flow rates.

Figure 8:
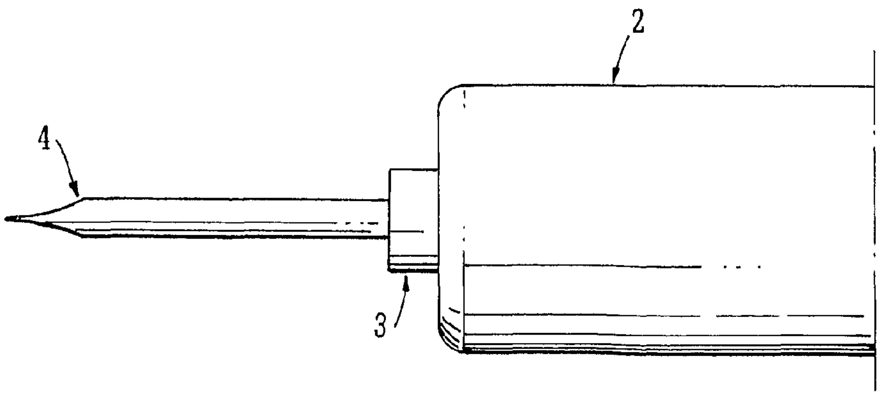
FIG. 8 shows an electrospray probe tip having a sharp tipped central wire according to a preferred embodiment which was used to acquire experimental data.

FIG. 8 shows an electrospray probe tip incorporating a sharp central wire 4 according to the preferred embodiment. An Electrospray probe tip as shown in FIG. 8 was used to provide the experimental data shown and discussed above in relation to curve (b) of FIG. 3, curve (b) of FIG. 4 and FIG. 7. The central wire 4 was 90 mm in diameter and was drawn to a sharp point. The central wire 4 was made of stainless steel.

The Electrospray capillary 3 had an internal diameter of 127 μm and the surrounding nebulizer gas capillary 2 had an internal diameter of 330 μm.

Figure 9A:
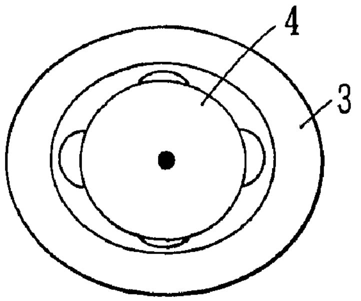
FIG. 9A shows an embodiment wherein the central wire is relatively large and has a circular cross-section and a number of radial protrusions to help centralise the wire.
Figure 9B:
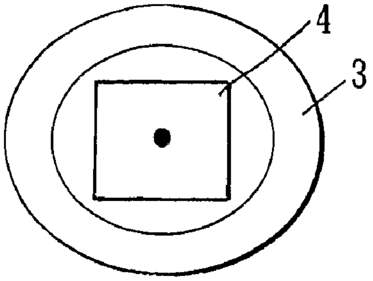
FIG. 9B shows an embodiment wherein the central wire has a square cross-section.
Figure 9C:
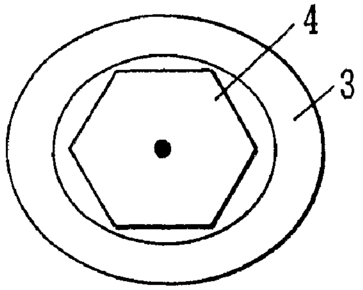
FIG. 9C shows an embodiment wherein the central wire has an hexagonal cross-section and FIG. 9D shows an embodiment wherein seven closely packed wires are provided within the Electrospray capillary.
Figure 9D:
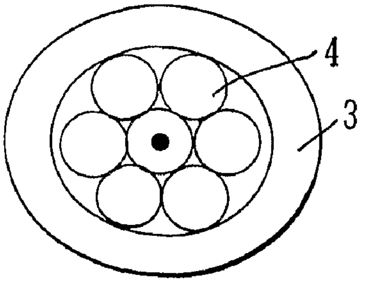

FIGS. 9A-D show various different embodiments of the present invention wherein the central wire 4 within the Electrospray capillary 3 has various different cross-sectional profiles. FIG. 9A shows an embodiment wherein the central wire 4 has a circular cross-section and has pinched or crimped sections that form radially extending protrusions at points along the length of the wire 4. The radially extending protrusions preferably help to position or centralise the central wire 4 within the open tube capillary 3. FIG. 9B shows another embodiment wherein the central wire 4 has a square cross-section such that the diagonal of the square is only slightly shorter than the inner diameter of the open tube capillary 3. The central wire 4 is preferably held central whilst allowing passageways for the flow of liquid. FIG. 9C shows a similar embodiment comprising a central wire 4 having an hexagonal cross-section. FIG. 9D shows an embodiment wherein a plurality of wires are provided in a closely packed arrangement. One wire, preferably the centremost wire, is preferably drawn to a sharp point. In other embodiments several or all of the other wires may additionally and/or alternatively be drawn to a sharp point.

Although the present invention has been described with reference to preferred embodiments, it will be understood by those skilled in the art that various changes in form and detail may be made without departing from the scope of the invention as set forth in the accompanying claims.

The invention claimed is:

1. An ion source comprising:

a first flow device;

a second flow device which surrounds at least part of said first flow device; and one or more wires, rods or obstructions located within said first flow device;

wherein one or more of said one or more wires, rods or obstructions are drawn to a relatively sharp point and extend or protrude a distance beyond the end of said first flow device.

2. An ion source as claimed in claim 1, wherein the distance is selected from the group consisting of: (i) 0.25-0.50 mm; (ii) 0.50-0.75 mm; (iii) 0.75-1.00 mm; (iv) 1.00-1.25 mm; (v) 1.25-1.50 mm; (vi) 1.50-1.75 mm; (vii) 1.75-2.00 mm; and (viii)>2.00 mm.

3. An ion source as claimed in claim 1, wherein said one or more wires, rods or obstructions comprise one or more outwardly extending radial protrusions which assist in positioning said one or more wires, rods or obstructions close to or substantially along the central axis of said first flow device.

4. An ion source as claimed in claim 1, wherein said first flow device comprises an Electrospray ionisation capillary.

5. An ion source as claimed in claim 1, wherein said first flow device comprises one or more capillary tubes.

6. An ion source as claimed in claim 1, wherein an analyte solution is supplied, in use, to said first flow device.

7. An ion source as claimed in claim 1, wherein said first flow device comprises one or more inwardly extending radial protrusions which assist in positioning said one or more wires, rods or obstructions close to or substantially along the central axis of said first flow device.

8. An ion source as claimed in claim 1, wherein said second flow device comprises one or more capillary tubes.

9. An ion source as claimed in claim 1, wherein a first gas is supplied, in use, to said second flow device, and wherein said first gas aids nebulisation of an analyte solution supplied, in use, to said first flow device.

10. An ion source as claimed in claim 1, wherein said ion source comprises an Electrospray ionisation ion source.

11. An ion source as claimed in claim 1, wherein said ion source comprises an Atmospheric Pressure Ionisation ion source.

12. An ion source as claimed in claim 1, further comprising a desolvation heater for heating a gas and providing a desolvation gas stream.

13. A mass spectrometer comprising an ion source as claimed in claim 1.

14. An ion source as claimed in claim 1, wherein said first flow device is configured to emit an analyte solution as an annular flow around said one or more wires, rods or obstructions.

15. An ion source as claimed in claim 1, wherein said first flow device and said one or more wires, rods or obstructions form an annular opening therebetween.

16. An ion source as claimed in claim 15, wherein the first and second flow devices are substantially coaxial and the one or more wires, rods or obstructions are located centrally within the first flow device.

17. An ion source as claimed in claim 1, wherein said one or more wires, rods or obstructions comprises a wire that reduces a cross-sectional dimension of a liquid layer in the first flow device so that in use said analyte solution is emitted from said first flow device as an annular flow around said wire.

18. A method of ionising a sample comprising:

supplying an analyte solution to a first flow device;

supplying a first gas to a second flow device which surrounds at least part of said first flow device; and providing one or more wires, rods or obstructions within said first flow device;

wherein one or more of said one or more wires, rods or obstructions are drawn to a relatively sharp point and extend or protrude a distance beyond the end of said first flow device.

19. A method of mass spectrometry comprising a method as claimed in claim 18.

20. A method of ionising a sample as claimed in claim 18, wherein said first gas aids nebulisation of said analyte solution.

21. A method of ionising a sample as claimed in claim 18, wherein said analyte solution is emitted from said first flow device as an annular flow around said one or more wires, rods or obstructions.

22. A method of ionising a sample as claimed in claim 18, wherein said one or more wires, rods or obstructions comprises a wire that reduces a cross-sectional dimension of a liquid layer in the first flow device so that said analyte solution is emitted from said first flow device as an annular flow around said wire.

* * * * *